United States Patent [19]

Discenzo

[11] Patent Number: 5,723,794
[45] Date of Patent: Mar. 3, 1998

[54] PHOTOELASTIC NEURAL TORQUE SENSOR

[75] Inventor: Frederick M. Discenzo, Brecksville, Ohio

[73] Assignee: Reliance Electric Industrial Company, Cleveland, Ohio

[21] Appl. No.: 537,202

[22] Filed: Sep. 29, 1995

[51] Int. Cl.$^6$ .................................................. G01L 1/24
[52] U.S. Cl. ........................................ 73/800; 73/862.324
[58] Field of Search ...................... 73/862.321, 862.324, 73/862.325, 849, 800

[56] References Cited

U.S. PATENT DOCUMENTS

| | | |
|---|---|---|
| 3,897,766 | 8/1975 | Pratt, Jr. et al. ............... 73/862.324 X |
| 3,902,805 | 9/1975 | Redner . |
| 3,934,459 | 1/1976 | Wolfinger et al. . |
| 3,950,987 | 4/1976 | Slezinger et al. . |
| 4,008,600 | 2/1977 | Bremer, Jr. et al. . |
| 4,123,158 | 10/1978 | Reyblatt ........................... 73/800 X |
| 4,282,756 | 8/1981 | Molnar et al. . |
| 4,320,966 | 3/1982 | Reytblatt . |
| 4,347,748 | 9/1982 | Pierson ............................. 73/862.324 |
| 4,520,681 | 6/1985 | Moore et al. .................. 73/862.324 X |
| 4,541,059 | 9/1985 | Toshihiko . |
| 4,648,274 | 3/1987 | Trainer . |
| 4,668,086 | 5/1987 | Redner . |
| 4,760,437 | 7/1988 | Denker et al. . |
| 4,977,516 | 12/1990 | Shepherd . |
| 4,979,124 | 12/1990 | Sachse et al. ...................... 73/587 X |
| 4,980,844 | 12/1990 | Demjanenko et al. . |
| 5,001,937 | 3/1991 | Bechtel et al. ..................... 73/862.324 |
| 5,298,964 | 3/1994 | Nelson et al. ...................... 73/800 X |
| 5,365,796 | 11/1994 | Lin et al. ........................... 73/862.391 |
| 5,433,115 | 7/1995 | Spillman, Jr. et al. ................... 73/773 |
| 5,438,882 | 8/1995 | Karim-panahi et al. ............ 73/862.324 |
| 5,495,774 | 3/1996 | Klauber et al. ..................... 73/862.333 |
| 5,501,105 | 3/1996 | Hernandez et al. ...................... 73/660 |

OTHER PUBLICATIONS

T. T. Jervis and W. J. Fitzgerald, "Optimization Schemes for Neural Networks", *Technical Reporting CUED/F–Infeninfeng/TR 144*, Cambridge University Engineering Department, Trumpington Street, Cambridge CB2 1PZ, England.

S. L. Toh, S. H. Tang and J. D. Hovanesian, "Computerized Photoelastic Fringe Multiplication", *Experimental Techniques*, Jul./Aug. 1990.

E. Umezake, T. Tamaki and S. Takashi, *Experimental Techiques*, Dec. 1989.

Bud Dublin, "Measuring Force and Strain in Industrial Applications", *Sensors*, Nov. 1989.

(List continued on next page.)

*Primary Examiner*—Elizabeth L. Dougherty
*Attorney, Agent, or Firm*—Michael E. Hudzinski; John M. Miller; John J. Horn

[57] ABSTRACT

An opto-mechanical torque sensing device suitable for use with rotary machinery integrates a photoelastic polymer detector, a light source, a photoelastic image sensor and an artificial intelligence neural network and algorithm. The photoelastic polymer is formed into a hollow cylinder and bonded to metal collars located at each end of the cylinder. The collars serve to readily place the cylinder detector over a machine shaft and affix it to the shaft using a keyway, setscrew, or spring pin. Alternatively, split collars and a split sleeve can also be used to clamp the detector to the shaft. In the presence of polarized light, the photoelastic polymer detector generates an optical fringe pattern that varies as a function of torque applied to the shaft or other machine part on which the detector is mounted. The artificial intelligence neural network learns the mapping relationship between the observed optical fringe pattern and the applied torque using a training procedure. Once trained, the neural network generates a signal representative of torque in the shaft based on observed fringe pattern.

24 Claims, 5 Drawing Sheets

OTHER PUBLICATIONS

Terrence Lynch, "Socket Wrench Extension Senses Torques", *Design News*, Aug. 2, 1993.

A. Mondina, C. Pappalettere and M. Sangirardi, "Polycarbonate Photoelastic Coatings for Curved Specimens", *Experimental Techniques*, Dec. 1985.

"Spectral–Content Readout of Stress Induced Birefringence", Ames Research Center, Moffett Field, California.

George C. Madzsar, "Noncontact Measurement of Shaft Speed, Torque and Power", *NASA Tech Briefs*.

Wireless Data Corporation Catalog.

James S. Sirkis, Yung–Mein Chen, Harmeet Singh and Amy YouHong Cheng, "Computerized Optical Fringe Pattern Analysis in Photomechanics: A Review", *Optical Engineering*, Feb. 1992, vol. 31 No. 2.

PHOTOELASTIC NEURAL TORQUE SENSOR

BACKGROUND OF THE INVENTION

The present invention relates to torque sensors and more particularly to torque sensors which exploit fringe patterns established in stressed photoelastic materials.

A large set of transparent materials can be classified as doubly refracting or "birefringent" materials. Materials with this property including glass, crystals and some plastics are capable of resolving a light vector into two orthogonal components and then transmitting each component from or through the material at different velocities. The resulting speed difference results in a phase shift between the two orthogonal light components. When viewed through a polarizing filter, such phase shifted light appears as a fringe pattern.

The fringe pattern phenomenon observed in birefringent materials is a function of the magnitude of principal stresses applied to the material. Consequently, this phenomenon has been used in the past for qualitative and quantitative analyses of mechanical parts and structures. However, experimental stress analyses which employ such photoelastic materials have in the past required interpretation of the resulting fringe patterns by visual observation which requires specialized filtering and alignment equipment. As an example, polariscopes have been used. The equipment necessary is expensive, bulky and sensitive to vibration and improper set-up or alignment.

Another method of indirectly measuring stress in a plate by measuring birefringence of light waves propagating at different speeds through the stressed plate or through a coating on the plate is to split the light wave emerging from the material into at least two beams, then filter each beam with a separate filter, each of which transmits a different wave length. The light intensity from each filter is then transformed into an electrical signal. The electrical signals are compared to measure the phase shift which is directly proportional to the birefringence. This method is complicated and limited to measuring stress in a material only at a single point rather than over a larger portion of the material.

Traditional mechanical approaches to measuring torque, ie. torsional compliance in a member such as a shaft, are bulky and prone to breakage. One example uses a pair of cooperative encoders each attached at opposite ends of a narrowed shaft. The torsional compliance is concentrated at the narrowed region where the shaft twists imparting relative motion between the encoder input members. This angular difference signal is then used to calculate the torque in the shaft. However, if the shaft experiences high levels of torque, the narrowed region is likely to break rendering the device inoperative. In addition, this type of device requires connection equipment for implementation such as couplers or other attaching members such as U-joints or the like.

It is therefore an object of the present invention to provide a torque sensor which provides a torque measurement signal without the need for additional connecting hardware or without the need for adversely weakening portions of the transmission system.

It is also an object of the present invention to provide a photoelastic torque sensor which provides a direct mapping from an observed optical fringe pattern to torque in a shaft or drive member without the need for expensive, bulky or sensitive equipment.

It is another object of the present invention to provide fringe pattern interpreter for transforming the optical fringe patterns into an intensity matrix adapted for direct input into a neural network which is trainable to perform a mapping from the intensity matrix to a torque output signal.

It is a further object of the present invention to provide a photoelastic torque sensor apparatus including a neural network processing system operable in conjunction with both static and dynamic drive systems to determine torque in a shaft, gear, or other drive component between a load and a prime mover.

It is yet a further object of the present invention to provide a photoelastic sensor apparatus including a neural network processing system operable in conjunction with both static and dynamic systems to determine the extent of material deformation in any type part, machine or system due to vibration, temperature, pressure or other physical or chemical phenomenon causing movement or changes in relative position.

SUMMARY OF THE INVENTION

The present invention constitutes a torque sensing method and apparatus for use in conjunction with rotating and static systems which include a compliant member. The torque sensor includes a polarized light source for generating a first polarized light signal, a cylindrical photoelastic member attached to the compliant member and adapted to receive said first light signal and generate a phase shifted light signal based on a magnitude of flexure in the compliant member. A CCD video detector is used for receiving the phase shifted second light signal and generating a set of electric signals based on the phase shifted second light signal. A specially trained neural network adapted to receive the set of digitized electric signals generates a torque output signal representative of the magnitude of flexure in the compliant member.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 2 is a schematic representation of the preferred photoelastic sleeve configuration used with the torque sensor of FIG. 1;

DESCRIPTION OF THE PREFERRED EMBODIMENTS

Figure 1:
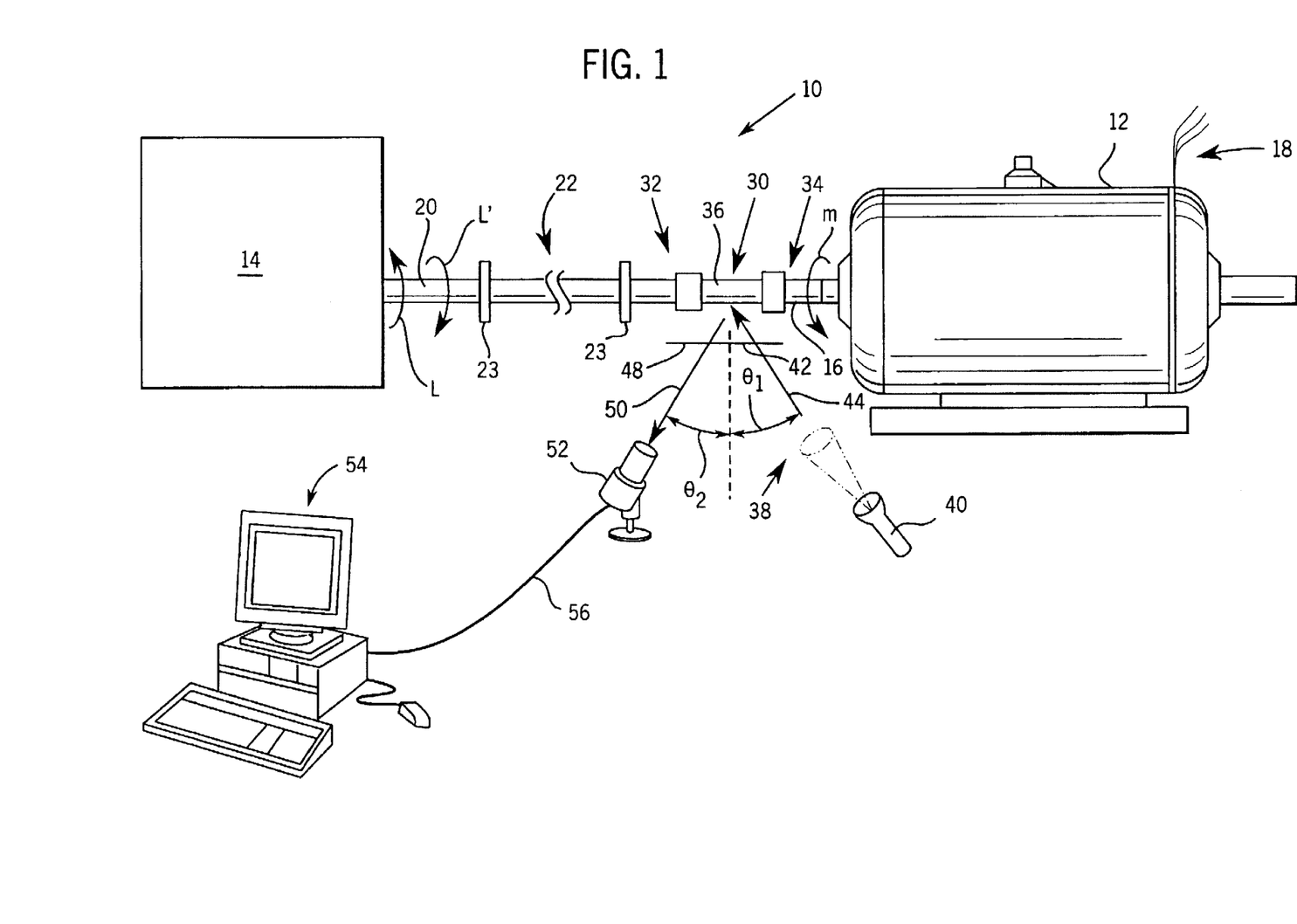
FIG. 1 is a schematic representation of the preferred photoelastic torque sensor according to the present invention.

With reference now to the drawings wherein showings are for purposes of illustrating the preferred embodiments of the invention only and not for purposes of limiting same. FIG. 1 shows a photoelastic neural torque sensor apparatus 10 which is particularly useful in combination with a shaft or coupling for connecting a motor 12 to a rotating or frictional load 14. The motor 12 produces a rotational driving force M on an output shaft 16 responsive to AC or DC signals received on input terminals 18. A load input shaft 20 is connected to the motor output shaft 16 through a drive system 22 which may include one or more couplings 23, pulleys, belts, gears or shafts alone or arranged in various combinations. In most modes of operation, the load 14 produces a load force L opposite the rotational force M generated by the motor. In other modes of operation, the load 14 can at times produce a load force L' in the direction of the rotational force M generated by the motor 12, in effect back driving the motor. In any case, it is often necessary or desirable to sense the torque in one or more elements of a drive system between a load and a prime mover such as with the torque sensor of the present invention for purposes of control, diagnostics, and for other uses.

The photoelastic neural torque sensor apparatus 10 illustrated in FIG. 1. includes a cylindrical sleeve 30 attached on both extreme ends 32, 34 to the motor output shaft 16. As will become apparent from the discussion to follow however, the sleeve may be placed on any torsionally compliant drive shaft between the motor and load. The sleeve is provided with a central flexible photoelastic region 36 which distorts as the ends 32,34 move relative to one another due to torsional flexing in the length of motor shaft 16 between the ends 32,34. A polarized light source 38 includes a white light source 40 and a first polarizing filter 42 for generating an incident polarized light signal 44 which is reflected from a mirrored inner surface (46 FIG. 2) of the sleeve 30 and passed through a second polarizing filter 48 to produce a reflected light signal 50. Although illustrated as comprising separate elements, the polarizing filters 42,48 may be combined into a single polarizing filter unit. The reflected light signal 50 is received into a light signal detector 52 for generating an electric signal representing the reflected light signal 50. The detector 52 is preferably connected to a neural network processing system 54 through a signal line 56. The neural network processing system 54 includes pattern recognition and other numeric and logical processing capabilities which will be described in greater detail below.

The incident polarized light signal 44 is directed at the sleeve at a first incident angle $\Theta_1$ as illustrated and collected into the light signal detector 52 at a second reflected angle $\Theta_2$. A small first incident angle $\Theta_1$ of near zero (0) degrees, or normal to the sleeve surface, and a slight second reflected angle $\Theta_2$ of about thirty (30) degrees yields satisfactory results for the preferred embodiment illustrated. As an alternative in certain applications however, the angle $(e_1+e_2)$ between the incident polarized light signal 44 and the reflected light signal 50 may be decreased or increased so as to cause total internal reflection or other reflection schemes within the material comprising the polycarbonate member 76.

Operationally, the cylindrical sleeve 30 is illuminated by the polarized light of the incident light signal 44. The polarized light passes first into the photoelastic region 36, is reflected by the mirrored inner surface 46 of the sleeve, and passes outward through the photoelastic region 36 for a second time.

The reflected light incurs an optical phase shift or frequency shift as it travels twice through the photoelastic region 36. The amount of optical phase shift is dependent upon the material thickness, wavelength of light used, and the amount of flexure or strain in the photoelastic region 36 at that point caused by the relative angular movement between the sleeve ends 32,34. The relative movement between the sleeve ends is in turn dependent upon the amount of torsional flexure in the shaft 16 between the attachment points 32,34 of the sleeve 30. Torsional flexure is in turn a function of the applied torque in the shaft.

The optical phase shift is a two-dimensional function of position on the surface of the photoelastic region 36. The light reflected from the photoelastic region passes through the second polarizing filter 48 which converts the two-dimension optical phase shift function into a two-dimensional intensity function. The two-dimensional intensity function is adapted for direct viewing by an ordinary optical detector such as by a grey scale CCD video camera 58 comprising the light signal detector 52. Each of the filters described above are linear polarizers and as such produce a linear polarization effect. However, other polarizing filters may be used as well in certain applications such as, for example, circular polarizing filters for producing circular polarization effects. Also, since the phase shifted light or fringe pattern identified above produces visible color signals, it is possible that for certain applications, a color filter (eg. red, green, blue) along with a color CCD camera may produce advantageous results.

Figures 2, 7:
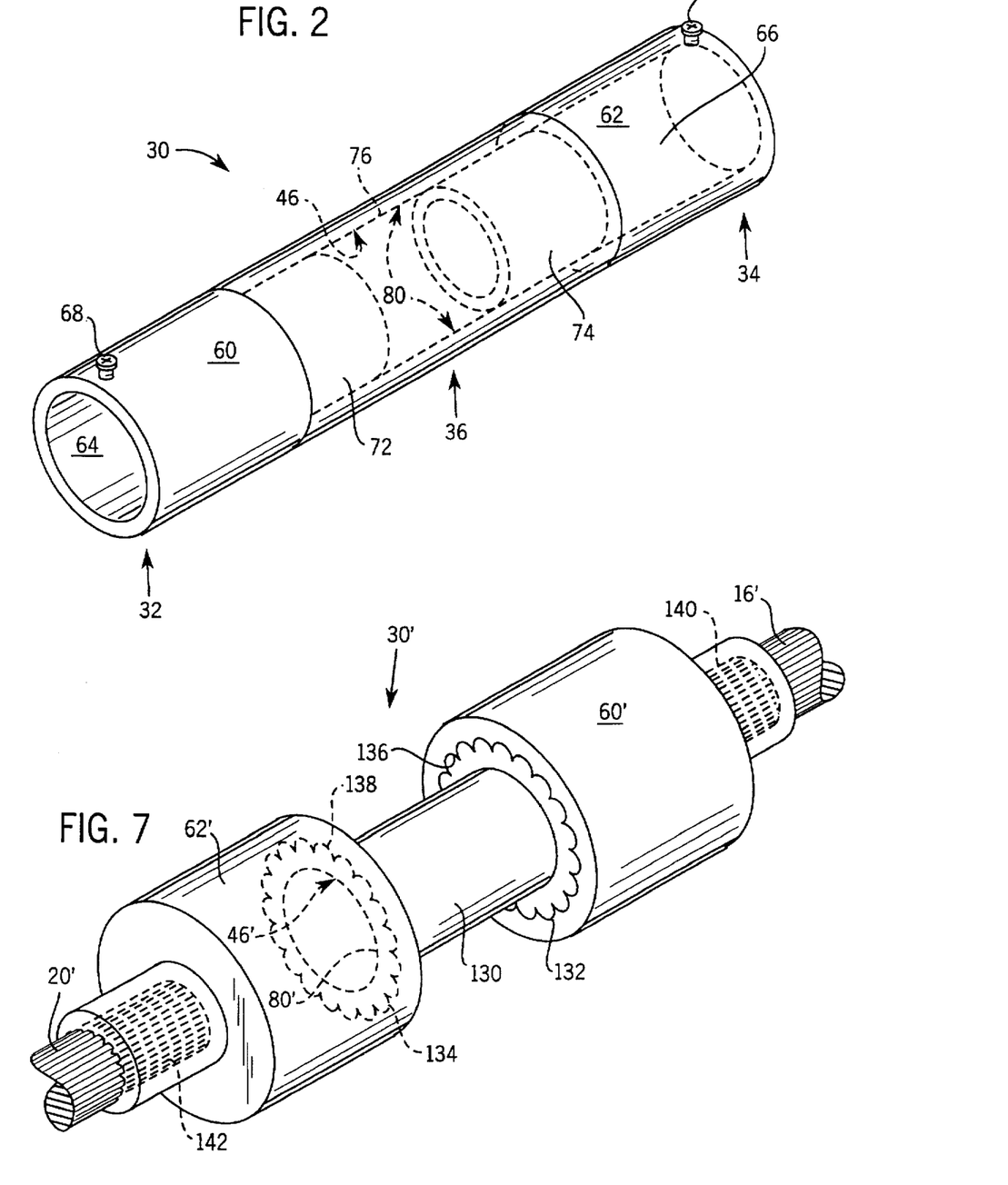

Referring now to FIG. 2, design details are shown for a first embodiment of the photoelastic sleeve 30 including a first collar 60 on the first end 32 of the sleeve and a second collar 62 on the second end 34 of the sleeve. Each of the collars are preferably formed from light weight aluminum but may be constructed from other similar hardness materials such as low carbon steels, brass, or the like. As illustrated, the collars 60,62 are substantially cylindrical in overall shape and each respectively defines a smooth internal passageway 64 and 66. The internal passageways are adapted to slide over and loosely receive the motor shaft therethrough. The collars 60,62 are drilled, tapped, and provided with threaded set screws 68,70 for attaching each collar to the shaft. Through one or more further machining operations, reduced diameter shoulder regions 72,74 are respectively provided on each of the collars 60,62 as illustrated. The outer diameter of the shoulder regions 72,74 match and are selected to substantially correspond to the inner diameter of a hollow cylindrical polycarbonate member 76 comprising the photoelastic region 36 of the sleeve 30. The polycarbonate member 76 is preferably attached to the collars 60,62 using an epoxy material such as PC-1 available from Measurements, Inc.

In the embodiment illustrated in the FIGURE, it is important that the ends of the polycarbonate sleeve member 76 remain securely bonded to the collars 60,62. Even though the maximum torsional strain the sleeve encounters is limited by the torsional stiffness of the steel motor shaft 16 or drive shafts 22 that it is mounted on, it is possible that under extreme torque conditions, the relative angular movement between the sleeve ends 32,34 may break the bonds. A bonding failure between the polycarbonate member 76 and one or both collars 60,62 will result in a loss of the desired deformation in the member 76 which, under normal operating conditions before the break, is proportional to the deformation in the shaft 16. Thus, sensor functionality is lost when a bonding failure occurs.

Accordingly, it is advantageous, prior to bonding, to perform a chemical abrasion process on the portions of the polycarbonate member intended to contact the aluminum collars 60,62. Although it is possible to chemically etch both the collars as well as the polycarbonate member 76, it has been found that an etchant such as MEK readily available from most chemically suppliers applied to the inner diameter of the polycarbonate member 76 works well to adequately prepare a suitable bonding surface.

As indicated above, the preferred epoxy material 78 for bonding the polycarbonate member 76 to the collars 60,62 is PC-1 available from Measurements, Inc. This epoxy resin contains a bisphenol-A based epoxy resin, phenyl glycidyl ether and about 10% aluminum. The hardener contains diethylenetriamine and aminoethyllpiperazine. However, it is possible that different epoxies available from other vendors would perform adequately as well. One alternative epoxy is 2216 B/A available from 3M Corporation which, although provides better adhesion between the parts, exhibits a characteristic modulus of shear elasticity significantly less than the preferred PC-1 epoxy identified above. For the configuration of the first embodiment of the photoelastic sleeve 30 shown in FIG. 2, the negative effect of the more elastic 2216 A/B epoxy is a substantial reduction in fringe order observed in sleeves constructed with this epoxy.

The inner surface 42 of the hollow cylindrical polycarbonate member 76 is coated with a reflective material 80 preferably an aluminum filled epoxy, although other similar substances or films may be used such as a silver filled epoxy. Before the reflective epoxy material is applied, it may be desirable to chemically etch the inner surface of the polycarbonate member in order to provide a suitable adhesive surface.

With regard to the polycarbonate member 76 itself, a number of basic methods of manufacture are possible including casting the photoelastic material to the desired shape, injection molding, extruding the material, molding the member by forming semi-molten polycarbonate around a mandrel or machining the polymer as needed, and casting the photoelastic material into a sheet then forming the sheet around a mandrel. However, due to the rapid exothermic reaction of the casting polymer and various process monitoring difficulties, casting the photoelastic material to produce consistent results often proves to be a difficult task. Water absorption into the part and rapid cooling tendencies make molding the member a less than desirable approach. Consequently, the preferred methods of manufacturing the polycarbonate member 76 are to utilize extruded hollow cylindrical tubes cut to length or machine the polymer as needed and then stress relieve the machined part afterwards.

Thus, starting with a polycarbonate material having good photoelastic properties such as Makrolon 3103 available from Miles, Inc., the polycarbonate member 76 is machined to the overall shape as illustrated in FIG. 2. Although Makrolon 3103 is preferred, other materials may be used as well such as G.E. Lexan and various industrial grade polycarbonates which may prove to be a lower cost material with good photoelastic properties. Roughly, the outer diameter of the tubular carbonate member is two (2) inches, the inner diameter is one and three quarters (1.75) inches and the length is three (3) inches. Various machining operations may be used to shape the part such as cut-off, drilling, grinding, polishing and buffing. Since initial extrusion and each machining or part handling operation introduces residual stresses and strains in the material which affect the birefringence of the material, a precise time-temperature annealing process is required in order to stress-relieve the polycarbonate part. If annealing were not performed, the residual stresses in the part resulting from the extrusion, cooling and machining processes will lead to the appearance of fantom fringe patterns even without the part being deformed resulting in spurious torque readings. These inherent or residual fringes make it difficult to recognize new fringes developed in the material and further, make it difficult to predict the fringe pattern to expect for a known amount of strain placed on the material. One aspect of residual fringes however, is that one or more stress patterns may be intentionally disposed or "frozen" into the polycarbonate member 76 to promote subsequent fringe analysis without the need to significantly first deform the part. One possible application of this designed-in fringe pattern is for a three-dimensional stress analysis. However, according to the present invention, there is no need to pre-stress the part or to provide a base fringe pattern and thus, to the extent possible, all residual part stress is removed as outlined below before using the polycarbonate member 76 in the sleeve 30 as illustrated in FIG. 2.

Undesirable "frozen" stresses in the polycarbonate material are preferably removed by placing the part in an oven and controlling the temperature within the oven to rise slowly to about 155 degrees C. The parts in the oven are then held at this temperature of 155 degrees C for about ten (10) hours. After the ten (10) hour period, the temperature in the oven is gradually decreased at a rate of about two (2) degrees C per hour. The preferred polycarbonate stress relief thermal cycle is set forth below:

| STEP | TEMP. (C.) from to rate (C./hr) | | | TIME REQ'D | notes | cycle end time |
|---|---|---|---|---|---|---|
| 1. | 22 | 22 | 0 | 10 sec. | start of cycle | 11:30 pm |
| 2. | 22 | 115 | 15 | 6.2 hr. | | 5:42 pm |
| 3. | 115 | 115 | 0 | 7 hr. | condition part | 12:42 am |
| 4. | 115 | 155 | 15 | 2.7 hr. | | 3:24 am |
| 5. | 155 | 155 | 0 | 10 hr. | stress relieve | 1:24 pm |
| 6. | 155 | 125 | 2 | 15 hr. | slow cool | 4:24 am |
| 7. | 125 | 100 | 2 | 12.5 hr. | 2 steps req'd | 4:54 pm |
| 8. | 100 | 70 | 5 | 6 hr. | cool faster | 10:54 pm |
| 9. | 70 | 22 | 10 | 4.8 hr. | and faster | 3:42 am |

Although other time-temperature annealing profiles are possible for differently sized or configured parts, the above process lasts about four (4) days and is preferred for the polycarbonate material in the sleeve 30 as illustrated in FIG. 2.

By using the above described annealing time-temperature profile, it is possible to experience a 4–6% change in part dimensions following the process making the resultant part size somewhat imprecise. However, by following the preferred annealing profile above with a final machining step, then another annealing process, accurate part sizes which meet stringent dimensional requirements are possible and have been obtained.

The basic components of photoelastic torque sensor apparatus 10 having been thus described, attention will now be directed to the details of image acquisition and of the neural network processing system 54 including neural network training and use.

The preferred neural network processing system 54 of the present invention is a standard three (3) layer feed-forward, back propagation neural network with at least thirty-two (32) input nodes, one (1) output node and ten (10) nodes in a single hidden layer. One network scheme found to work adequately, however, is an eight (8) input, twelve (12) inner layer and one (1) output topology. Although neural networks can be used as pattern classifiers for other applications, the neural network processing system 54 of the present invention is used as a functional estimator. More particularly, the neural network processing system 54 of the present invention is used to "learn" the mapping function between an optical fringe pattern detected by the CCD Video Camera 58 and a shaft torque measured by a strain gauge reference torque sensor 90 used in the training system 10' shown in FIG. 3.

Figure 3:
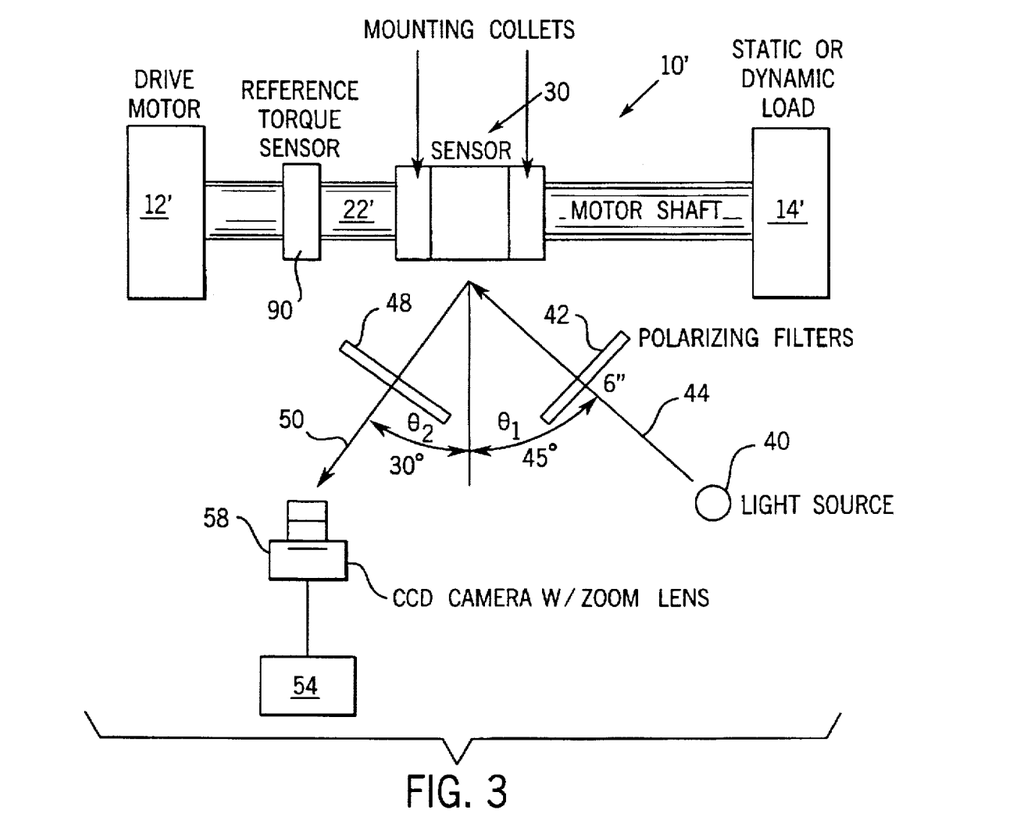
FIG. 3 illustrates a configuration and apparatus used for training the neural network processing system of the torque sensor of FIG. 1.

As illustrated in that FIG., the reference torque sensor 90 is mounted to the shaft 22' between the motor 12' providing the torque and the sleeve 30. Preferably, the torque sensor 90 used for training the neural network 54 is a strain gauge based sensor model MCRT Torquemeter 24-02T (35-1), 0.2% accuracy, available from S. Himmelstein & Co., having a transformer coupling from the rotor to the stator, ie. no slip rings. During the neural network training sessions, the load 14' is controllable and may be a static load for static neural network training or a dynamic load for dynamic neural network training.

The preferred method used for training the neural network of the present invention is the quick propagation technique. This training method yields the lowest training error and results in reasonable training times compared to other workable, though less efficient, techniques such as scaled conjugate gradient, delta-bar-delta and ABP algorithms. A complete description of the quick propagation technique as well as other training schemes can be found in T. T. Jervis and W. J. Fitzgerald, "Optimization Schemes for Neural Networks," *Technical Report CUED/F-INFENG/TR* 144, Cambridge University Engineering department, Trumpington Street, Cambridge CB2 1PZ, England, the teachings of which are incorporated herein by reference. One approach to reducing the training time required is to espouse a completely different neural network architecture such as the random vector enhanced phaser neural network RV-PNN, as an example. For certain applications, this specialized network may be appropriate.

Figure 4:
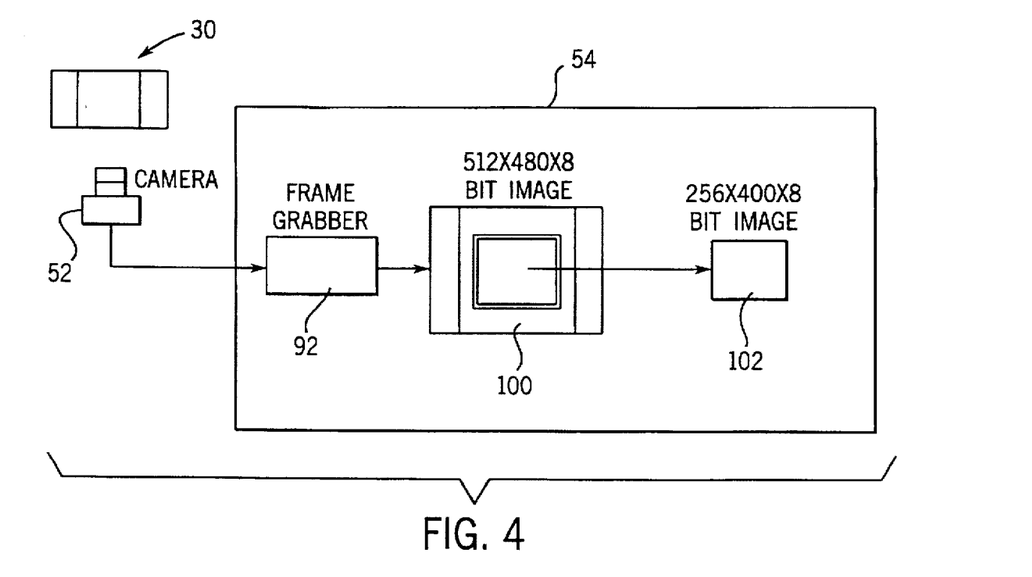
FIG. 4 shows a preferred image pre-processing scheme used in conjunction with the preferred photoelastic torque sensor of FIG. 1.

Because the preferred neural network is used as a functional estimator in the present invention, any noise in the input image will normally create a corresponding variation in the output torque estimation. For this reason, a low-noise camera such as the Sony model XC77 grey scale COD camera is preferred for use as the camera 58 of the system. The image acquired by the Sony XC-77 CCD camera 58 is sent to a Matrix MVP VME frame grabber 92 via the signal line 56. The frame grabber produces 512×480 8-bit gray scale images 100 as shown in FIG. 4. Because only the photoelastic region 36 of the sleeve 30 is of interest for subsequent torque calculation processing, the 512×480 8-bit gray scale images 100 are preferably cropped to 256×400 8-bit pixels 102 as illustrated. Only the central regions of the 512×480 8-bit gray scale images 100 are retained in the cropped images 102. This cropping step results in subsequent savings in memory storage requirements and processing time without adversely affecting accuracy.

As indicated above, the optical intensity image from the camera 58 is input into a neural network to estimate the shaft torque. The motivation for using the neural network to process the image information is that neural networks are excellent functional estimators and are able to learn the functional mapping from intensity patterns to shaft torque. However, a 256×400 pixel image 102 represents more than a hundred thousand individual sensor inputs which are far too many inputs to practically input into a neural network. In an effort therefore to reduce the number of inputs to the neural network 54, various patterns of selected pixels may be used to determine image features such as for example, vertical strips, horizontal strips, and diagonal strips carved from the cropped pixel image 102. Each possible pattern alternative comprises a number of cells where each cell consists of a square array of image pixels. The pixels in each cell are averaged to produce a single input to the neural network corresponding to each cell. In an alternative embodiment however, the pixels in each cell may be summed to produce a single input to the neural network corresponding to each cell. All pixels outside the cell boundaries are ignored as inputs. In order to more accurately represent a real physical sensor system and to limit the neural network inputs to a manageable number, each pattern typically contains thirty-two (32) cells. Examples of patterns include the preferred single horizontal strip of thirty-two (32) cells shown in FIG. 5A. Other possible patterns include cris-crossing diagonal strips of 16 cells each shown in FIG. 5B, a set of three vertical strips of sixteen (16) cells shown in FIG. 5C, a set of three horizontal strips of sixteen (16) cells each shown in FIG. 5D, and a single vertical strip of eight (8) cells shown in FIG. 5E. Another form of image pre-processing is to use a histogram of the entire intensity image using sixty-four (64) bins. Typically, only the central forty-eight (48) bins would be non-zero zero and the remaining bins discarded or ignored.

Figure 5A:
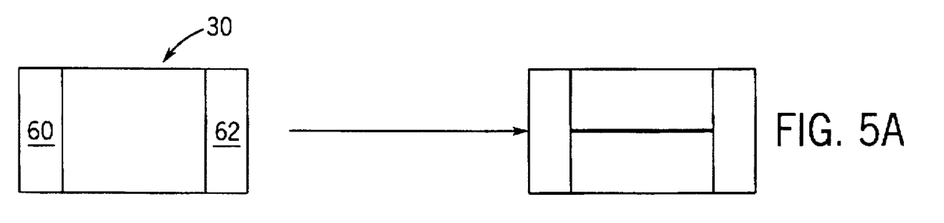
FIGS. 5A–5E show preferred additional image pre-processing schemes used in conjunction with the preferred photoelastic torque sensor of FIG. 1 and with the first image pre-processing scheme of FIG. 4.

The preferred image pre-processing scheme illustrated in FIG. 5A reduces the cropped image 102 to a single horizontal strip of 32 cells, where each cell is 8×24 pixels. The preferred neural network architecture therefore is a 3-layer feed-forward architecture having 32 input nodes, 15 hidden nodes., and a single output node.

Figure 5B:
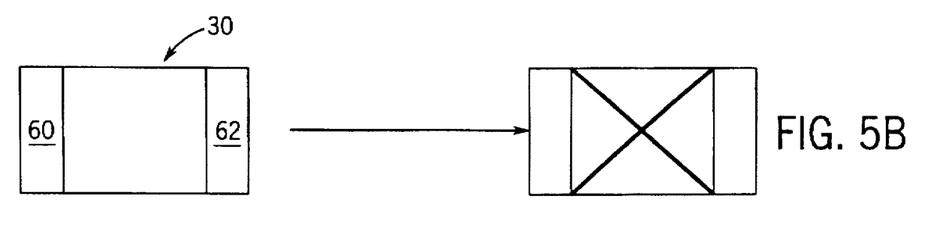

The image pre-processing scheme illustrated in FIG. 5B reduces the cropped image 102 to a pair of diagonal strips of 16 cells where each cell is a 16×16 pixel array. Each of these 32 cells is then used as an input to the 3-layer feed-forward neural network having a topology of 32 input nodes, 15 hidden nodes, and a single output node.

Figure 5C:
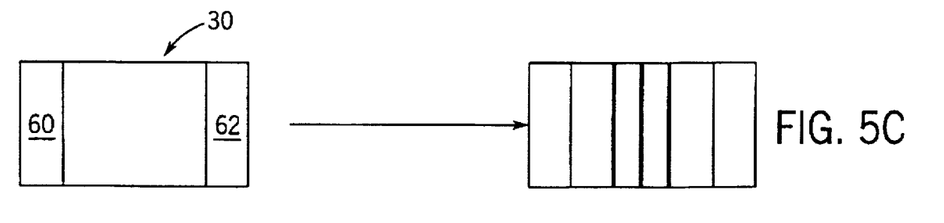

The image pre-processing scheme illustrated in FIG. 5C reduces the cropped image 102 to a set of three vertical strips of 16 cells where each cell is a 16×16 pixel array for a total of 48 cells or forty-eight inputs into the 2-layer feed-forward neural network. The neural network architecture, using this preprocessing scheme therefore, is a 48 input node, 15 hidden node and single output node arrangement.

Figure 5D:
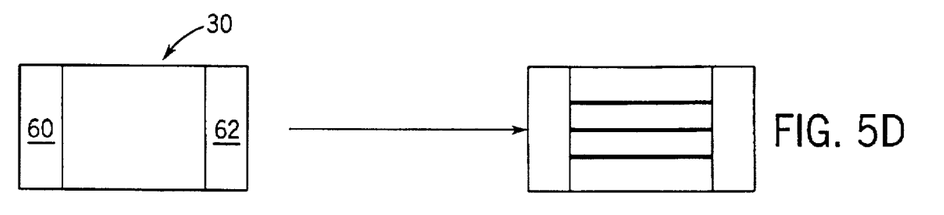
Figure 5E:
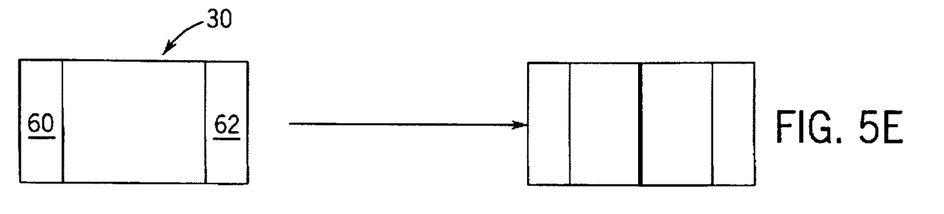

FIG. 5D illustrates an imaging pre-processing scheme which reduces the cropped image 102 to a set of three horizontal strips of 16 cells where each cell is a 16×16 pixel and each strip has 16 cells for a total of 48 cells or inputs into the 2-layer feedforward neural network. The neural network architecture using the pre-processing scheme illustrated in FIG. 5D is a 4 input node, 15 hidden node and single output node arrangement.

Other pre-processing schemes are possible, as indicated above, including a histogram approach using 64 gray levels where only gray levels 8 to 56 are used as neural network inputs resulting in a neural network architecture of 48 input nodes, 15 hidden nodes, and a single output node. Lastly, pseudo-color image pre-processing schemes are possible including a scheme using a single horizontal strip of 16×16 pixel matrices from each of the three color images Red, Green, and Yellow. Each strip is reduced to 16 cells for a total of 48 cells or inputs into the 2-layer feed-forward neural network for a topology of 48 input nodes, 15 hidden nodes, and a single output node.

As indicated above, the preferred pre-processing scheme is the single horizontal strip technique illustrated in FIG. 5A. Under static conditions, the neural network 54 is trained according to the quick propagation training algorithm by establishing a first torque in the training apparatus 10' and repeatedly applying the 32 cell inputs to the neural network until the output of the network gives the corresponding torque value output to within a predetermined training tolerance. The weightings within the hidden layers of the neural network are adjusted in order that the network properly maps the image inputs to the actual torque sensed by the torque sensor 90. Next, a second static torque is established in the training apparatus 10' and the above procedure repeated until the neural network successfully maps the image input to the actual torque sense by the torque sensor 90. The training systematically visits a range of input torque values within the range expected to be encountered by the apparatus in the normal operating mode. Once the neural network is adequately trained using the quick propagation training algorithm, successive unknown static torques established in the photoelastic torque sensor apparatus 10 (FIG. 1) results in an accurate torque output signal from the neural network 54 to within less than a one percent error.

For dynamic situations, measurements from rotating sensors may need to be synchronized to the shaft position. That is, both in the training sessions and in actual use of the photoelastic torque sensor apparatus 10, a synchronization mark or other indicia placed on the sleeve 30 in order to establish an imaging reference or datum point. Although the preferred torque sensor illustrated is designed to be axisymmetric, deviations in material thickness and other variations due to manual assembly and attaching techniques render the device somewhat less that axisymmetric. Thus, to the extent that the device is not perfectly axisymmetric, measurements from rotating sensors may need to be synchronized to the shaft position. Having established a reference or datum point, successive images of the rotating sleeve 30 are taken at the appropriate shaft angular position in order that each image registers repeatedly. In that manner, the same area of the polycarbonate member 76 is repeatedly imaged by the detector apparatus 52.

Further in dynamic systems, non-axisymmetrical devices will require a knowledge of the intended rotational speed and position of the shaft is desirable in that preferably, the neural network is trained at or near those rotational speeds contemplated during actual operation. As an example, if the normal operating speed of the subject motor or shaft is 1800 rpm, the neural network 54 should be trained at or near this speed in order to achieve predictable results under subsequent normal operating conditions.

Figure 6A:
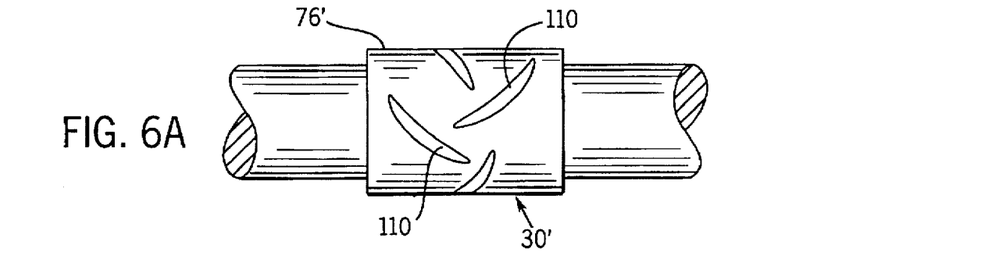
FIGS. 6A–6E illustrate alternative schematic representations of polycarbonate members which may be used in the photoelastic sleeve configuration FIG. 2; and, FIG. 7 shows an alternative photoelastic sleeve configuration wherein the sleeve is used as a load bearing member.

As an alternative to the smooth walled polycarbonate member 76 illustrated in FIG. 2, it is possible to concentrate the annular strain from end to end into small areas of the sleeve 30 by providing one or more grooves in the polycarbonate member 76' as shown in FIG. 6A. The grooves 110 may be cast into the polycarbonate member 76' or machined radially into the member using a "V" or "U" shaped end mill or other tool. The grooves may follow any suitable arrangement or pattern such as the regularly interlaced pattern illustrated. The grooves render portions of the sleeve 30' torsionally weaker than the remainder of the sleeve. Therefore, the areas around the grooves 110 undergo a greater amount of torsional strain. This being the case, a greater amount, i.e. more pronounced, fringe patterns are observable concentrated in the groove areas.

This alternative embodiment of the polycarbonate member may be useful for increasing sensitivity of the torque sensor apparatus at low torque levels. In addition, the grooves 110 disposed in the polycarbonate member may be of varied depth and geometry on a single device to provide good accuracy over a wide range of applied torque values.

Figure 6B:
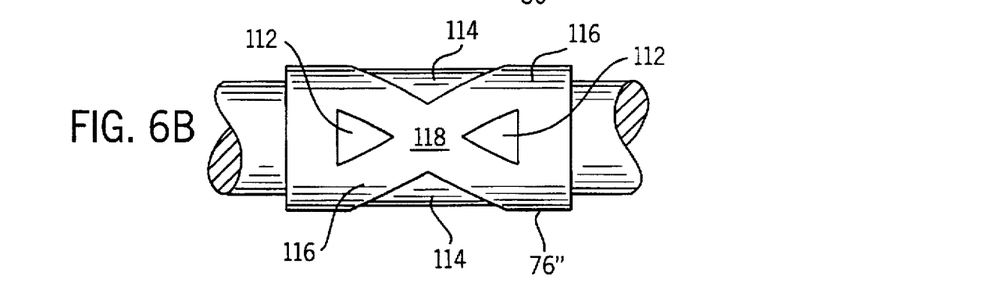

FIG. 6B shows another alternative design of the polycarbonate member. This alternative includes a set of triangular recesses 112 which, together with a set of squared recesses 114, provides a pronounced set of intersecting circumferential spiral ridges 116. The area of intersection 118 concentrates the strain in the polycarbonate member 76" to a high degree. An advantage of the embodiment illustrated is that the intersection area 118 may be imaged according to the preferred techniques described above to realize high accuracy torque sensing over a wide range of torque values.

Figure 6C:
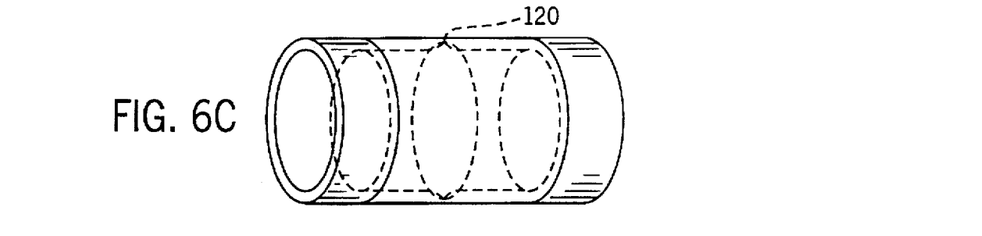

FIG. 6C shows yet another alternative design of the polycarbonate member. This alternative includes an axisymmetric groove 120 formed on the inner diameter of the polycarbonate member for providing localization of torsional strain for enhanced fringe pattern development. An advantage of the embodiment illustrated is that the area of the groove 120 may be imaged according to the preferred techniques described above to realize high accuracy torque sensing over a wide range of torque values.

Figure 6D:
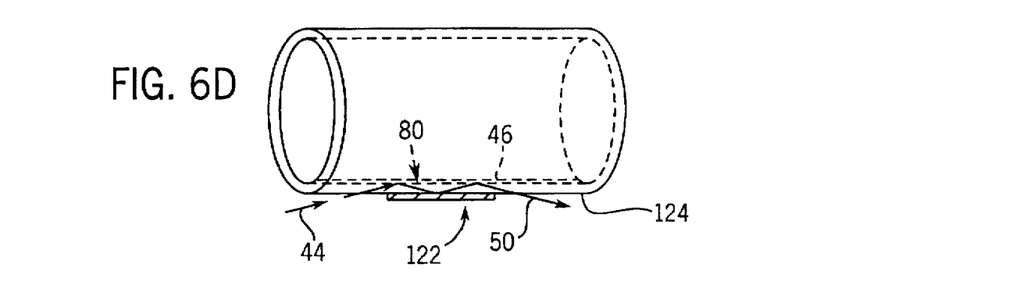

FIG. 6D shows still yet another alternative design of the polycarbonate member. This alternative includes a first reflective coating 80 on the inner surface 42 of the polycarbonate member as well as a reflective surface 122 over a portion of the outer surface 124 of the polycarbonate member. Using these two reflective surfaces, the incident polarized light signal 44 passes through the thickness of the sleeve four (4) times before exiting the polycarbonate material as the reflected light signal 50. The three times reflected light signal shown may be reflected more times if the outer reflective surface is made to cover a larger longitudinal area of the sleeve. An advantage of the embodiment illustrated is that the polycarbonate member may be imaged according to the preferred techniques described above without any additional modifications to realize high accuracy torque sensing over a wide range of torque values.

Figure 6E:
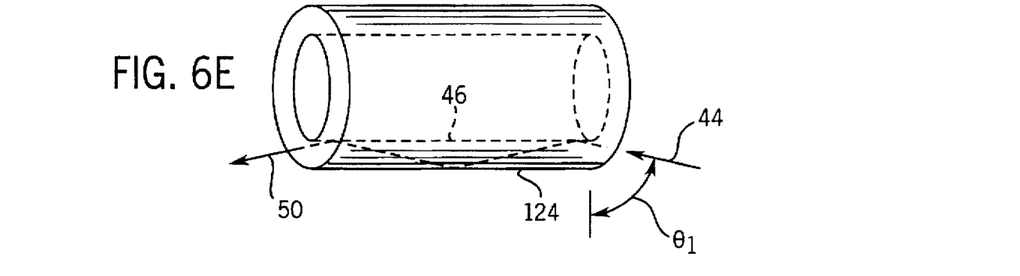

FIG. 6E shows yet again another alternative design of the polycarbonate member. This alternative relies on the phenomenon of total internal reflection wherein the inner surface 42 of the polycarbonate member as well as the outer surface 124 of the polycarbonate member act as reflective surfaces due to the large first incident angle $\Theta_1$. Using the two surfaces of the member as two reflective surfaces, the incident polarized light signal 44 passes through the thickness of the sleeve four (4) times before exiting the polycarbonate material through an end thereof as the reflected light signal 50. The three times reflected light signal shown may be reflected more times if the outer first incident angle $\Theta_1$ is increased. An advantage of the embodiment illustrated is that the polycarbonate member may be imaged according to the preferred techniques described above without any additional modifications to realize high accuracy torque sensing over a wide range of torque values.

An alternative embodiment sleeve 30' is illustrated in FIG. 7 where an output shaft 16' of a prime mover such as a motor (not shown) connects to an input shaft 20' of a load (not shown) using a polycarbonate member 130 as a torque bearing element. More particularly, unlike the first preferred embodiment illustrated in FIGS. 1–6 where the sleeve 30 merely attaches to the rotating shaft 22, the instant embodiment uses the polycarbonate member to connect otherwise unattached shafts 16', 20'. Therefore, in FIG. 7, the polycarbonate member 130 realizes or experiences all of the torque in the system between the shafts 16', 20'.

With continued reference to that FIGURE, the polycarbonate member 130 is substantially cylindrical and is attached on one end to a first collar 60' and on the other end to a second collar 62'. Although the collars are illustrated as including corrugated surfaces 132, 134 adapted to engage corresponding corrugated surfaces 136, 138 on the polycarbonate member 130, other attaching means are possible including the epoxy/etching technique described above. In addition to the corrugated surfaces 132, 134 provided, the collars 60', 62' include internal splines 140, 142 adapted to engage corresponding splines (not shown) provided on the shafts 16', 20'.

The polycarbonate member 130 of this embodiment includes a reflective inner surface as set forth with respect to the first preferred embodiment and is fabricated according to the machining or casting and annealing technique described in detail above.

As yet another alternative to the preferred embodiments described above, the device may be formed from a pair of longitudinally split collars and a longitudinally split sleeve for ease of clamping the detector to a shaft. Essentially, this alternative embodiment comprises the embodiment illustrated in FIG. 2 but separated along the longitudinal axis into two parts. The polycarbonate member may be attached to the split collar parts by providing an circular groove in each of the collar members in place of the shoulder regions discussed above. Preferable, the groove is formed wide enough to accommodate the thickness of the polycarbonate member.

While particular embodiments of the present invention have been shown and described, it should be clear that changes and modifications may be made to such embodiments without departing from the true scope and spirit of the invention. It is intended that the appended claims cover all such changes and modifications.

I claim:

1. A method of quantizing flexure in a material, the method comprising the steps of:

providing a photoelastic material;

flexing the photoelastic material into a first flexed orientation;

passing a first light signal through said photoelastic material disposed in said first flexed orientation, the first light signal exiting the photoelastic material at a plurality of points over the surface of the photoelastic material as a first modified light signal; and, in a neural network based on said first modified light signal, generating a first output signal representative of a first degree of flexure in said photoelastic material disposed in said first orientation.

2. The method of quantizing flexure in a material according to claim 1 further comprising the steps of:

flexing the photoelastic material into a second flexed orientation;

passing said first light signal through said photoelastic material disposed in said second flexed orientation, the first light signal exiting the photoelastic material at said plurality of points over the surface of the photoelastic material as a second modified light signal; and, in said neural network based on said second modified light signal, generating a second output signal representative of a second degree of flexure in said photoelastic material disposed in the second orientation.

3. A method of quantizing flexure in a material comprising the steps of:

providing an elongate portion of photoelastic material;

fixing a first end of said elongate portion of photoelastic material at a first region of a torsionally compliant shaft;

fixing a second end of said elongate portion of photoelastic material at a second region of said torsionally compliant shaft;

flexing the photoelastic material into a first flexed orientation by moving said first and second ends of the elongate portion of photoelastic material relative to one another by torsionally deforming said shaft between said first and second regions;

passing a first light signal through said photoelastic material disposed in said first flexed orientation, the first light signal exiting the photoelastic material as a first modified light signal; and, in a neural network based on said first modified light signal, generating a first output signal representative of a first degree of flexure in said photoelastic material disposed in said first orientation.

4. The method of quantizing flexure in a material according to claim 3 wherein the step of generating said first output signal includes generating a first torque output signal representative of a first degree of torque in said shaft between said first region of the shaft and said second region of the shaft.

5. The method of quantizing flexure in a material according to claim 4 wherein the step of providing said photoelastic material includes:

providing an elongate cylindrical portion of photoelastic material; and, disposing said elongate cylindrical portion of photoelastic material around said torsionally compliant shaft.

6. The method of quantizing flexure in a material according to claim 5 wherein the step of passing said first light signal through said photoelastic material includes: generating a polarized light signal; and, passing said polarized light signal through said photoelastic material.

7. The method of quantizing flexure in a material according to claim 6 wherein:

the step of providing said elongate cylindrical portion of photoelastic material includes providing a reflective surface within said elongate cylindrical portion; and, the step of passing said polarized light signal through said photoelastic material includes reflecting said polarized light signal from the reflective surface.

8. A method of quantizing flexure in a material comprising the steps of:

providing a photoelastic material;

flexing the photoelastic material into a first flexed orientation;

passing a first light signal through said photoelastic material disposed in said first flexed orientation, the first light signal exiting the photoelastic material as a first modified light signal;

while passing said first light signal through said photoelastic material, optically phase shifting said first light signal in said photoelastic material as said first modified light signal;

detecting said first modified light signal in a photoelectric array;

generating a set of output signals at said photoelectric array based on said first modified light signal; and, in a neural network based on said set of output signals, generating a torque output signal in said neural network.

9. The method according to claim 8 wherein the step of generating said set of output signals at said photoelectric array includes:

generating a plurality of image pixel signals in said photoelectric array;

selecting a first group of said plurality of image pixel signals as a first image pixel cell;

selecting a second group of said plurality of image pixel signals as a second image pixel cell;

based on a first predetermined operation on said first group of said plurality of image pixel signals, determining a first image pixel cell value of the first image pixel cell as a first one of said set of output signals; and, based on a second predetermined operation on said second group of said plurality of image pixel signals, determining a second image pixel cell value of the second image pixel cell as a second one of said set of output signals.

10. The method according to claim 9 wherein:

the step of determining said first image pixel cell value of the first image pixel cell as said first one of said set of output signals includes performing at least a one of an averaging operation and a summing operation on said first group of said plurality of image pixel signals; and, the step of determining said second image pixel cell value of the second image pixel cell as said second one of said set of output signals includes performing at least a one of an averaging operation and a summing operation on said second group of said plurality of image pixel signals.

11. The method according to claim 8 wherein the step of providing said photoelastic material includes:

providing a polycarbonate material; and, stress relieving the polycarbonate material by an annealing process.

12. The method according to claim 8 wherein the step of providing said photoelastic material includes providing a photoelastic material having at least one predetermined stress pattern disposed into the photoelastic material.

13. A torque sensor for use in conjunction with a drive system, the torque sensor comprising:

a light source for generating a first light signal;

a photoelastic member on at least a one of a drive member of the drive system and a driven member of the drive system, the photoelastic member being adapted to receive said first light signal and generate a phase shifted light signal based on a magnitude of flexure of the photoelastic member, the phase shifted light signal being a two dimensional phase shift function of position on the surface of the photoelastic material;

a detector for receiving the phase shifted second light signal as said two dimensional phase shift function of position on the surface of the photoelastic material and generating an electric signal based on the phase shifted second light signal; and, a processing apparatus adapted to receive said electric signal and generate a torque output signal representative of said magnitude of flexure in the photoelastic member.

14. The torque sensor according to claim 13 further comprising a first polarizing light filter for converting said phase shifted light signal into a two dimensional intensity function of said position on the surface of the photoelastic material.

15. The torque sensor according to claim 14 wherein said detector is adapted to receive at least two intensity signals from said two dimensional intensity function and generate at least two electric signals based on said at least two intensity signals.

16. The torque sensor according to claim 15 wherein said processing apparatus is a neural network adapted to receive said at least two electric signals and generate said torque output signal representative of said magnitude of flexure in said photoelastic member.

17. A torque sensor apparatus comprising:

a light source for generating a first light signal;

a first member including a photoelastic body portion, the first member having a first end and a second end, the photoelastic body portion being adapted to receive a first light signal and generate over the surface of the photoelastic body portion a phase shifted light signal based on a relative orientation of said first end to said second end;

a set of sensors adapted to receive said phase shifted light signal and generate a set of output signals based on the phase shifted light signal; and, a neural network adapted to receive said set of output signals and generate a torque output signal representative of said relative orientation of said first end of the first member to said second end of the first member.

18. The torque sensor apparatus according to claim 17 wherein:

the first end is adapted to engage at least one of a first operatively associated external drive member and a first operatively associated external driven member; and, the second end is adapted to engage at least one of a second operatively associated external drive member and a second operatively associated external driven member.

19. A torque sensor apparatus comprising:

a light source for generating a first light signal;

a photoelastic member having a first portion adapted to engage a first operatively associated external drive member, having a second portion adapted to engage a second operatively associated external drive member, and having a body portion connecting said first portion to said second portion, the body portion being adapted to receive said first light signal and generate a phase shifted light signal based on a relative orientation of said first portion to said second portion;

a set of sensors adapted to receive said phase shifted light signal and generate a set of output signals based on the phase shifted light signal; and, a neural network adapted to receive said set of output signals and generate a torque output signal representative of said relative orientation of said first portion of the photoelastic member to said second portion of the photoelastic member.

20. A method of determining torque between a drive member and a driven member comprising the steps of:

providing a first torque sensor element formed of a photoelastic material;

fixing a first portion of said first torque sensor element to the drive member;

fixing a second portion of said first torque sensor element to the driven member;

flexing the photoelastic material into a first flexed orientation by moving said first portion and said second portion of the first torque sensor element relative to one another based on a movement of said drive member relative to said driven member;

passing a first light signal through said photoelastic material disposed in said first flexed orientation, the first light signal exiting the photoelastic material at a plurality of points on the surface of the photoelastic material as a first modified light signal; and, in a neural network based on said first modified light signal, generating a first torque output signal representative of a first degree of torque in said photoelastic material disposed in said first orientation.

21. The method of determining torque according to claim 20 wherein the step of providing said first torque sensor element includes providing said first torque sensor element formed substantially entirely of said photoelastic material.

22. The method of determining torque according to claim 20 wherein the step of passing said first light signal through said photoelastic material includes: generating a polarized light signal; and, passing said polarized light signal through said photoelastic material.

23. The method of determining torque according to claim 22 wherein:

the step of providing said first torque sensor element includes providing a first torque sensor element having an elongate cylindrical portion of photoelastic material, the elongate cylindrical portion of photoelastic material including a reflective surface within said elongate cylindrical portion; and, the step of passing said polarized light signal through said photoelastic material includes reflecting said polarized light signal form the reflective surface.

24. The method of determining torque according to claim 20 wherein:

the step of fixing said first portion of said first torque sensor element to the drive member includes providing a first connecting element adapted on a first side to engage the first portion of the first torque sensor element and adapted on a second side to engage the drive member; and, the step of fixing said second portion of said first torque sensor element to the driven member includes providing a second connecting element adapted on a first side to engage the second portion of the first torque sensor element and adapted on a second side to engage to the driven member.

* * * * *